US005508373A

United States Patent [19]
Shah et al.

[11] Patent Number: 5,508,373
[45] Date of Patent: Apr. 16, 1996

[54] CURING AGENTS FOR EPOXY RESINS BASED ON 1,2-DIAMINOCYCLOHEXANE

[75] Inventors: Shailesh Shah, Dresher; Robert M. Moon, Maple Glenn, both of Pa.

[73] Assignee: Henkel Corporation, Plymouth Meeting, Pa.

[21] Appl. No.: 286,160

[22] Filed: Aug. 4, 1994

[51] Int. Cl.$^6$ .......................... C08G 59/44; C08G 59/50; C08G 65/00

[52] U.S. Cl. .................. 528/120; 525/504; 525/526; 528/111; 528/122; 528/407; 564/453

[58] Field of Search ............................ 528/122, 120, 528/407, 111; 525/526, 504; 564/453

[56] References Cited

U.S. PATENT DOCUMENTS

| | | | |
|---|---|---|---|
| 2,651,589 | 9/1953 | Shokal et al. ........................ | 154/140 |
| 2,705,223 | 3/1955 | Renfrew et al. ..................... | 260/18 |
| 2,811,495 | 10/1957 | Wittcoff et al. ..................... | 260/18 |
| 2,817,644 | 12/1957 | Shokal et al. ....................... | 528/122 |
| 2,864,775 | 12/1958 | Newey ................................ | 260/2 |
| 2,899,397 | 8/1959 | Aelony et al. ....................... | 260/18 |
| 3,249,412 | 5/1966 | Kolek et al. ........................ | 65/3 |
| 3,301,804 | 1/1967 | Zors et al. .......................... | 260/29.2 |
| 3,366,600 | 1/1968 | Haberliin et al. .................... | 260/47 |
| 3,515,698 | 6/1970 | Mauz et al. ......................... | 260/75 |
| 3,538,184 | 11/1970 | Heer et al. .......................... | 528/111 |
| 3,547,881 | 12/1970 | Mueller et al. ...................... | 260/47 |
| 3,629,181 | 12/1971 | Heer et al. .......................... | 528/122 |
| 3,634,348 | 1/1972 | Carter et al. ........................ | 260/18 |
| 3,639,344 | 2/1972 | Kinnemah et al. ................... | 260/47 |
| 3,931,109 | 1/1976 | Martin ................................ | 260/47 |
| 4,031,050 | 6/1977 | Jerabek .............................. | 260/29.2 |
| 4,033,917 | 7/1977 | Sekmakas et al. .................. | 260/29.2 |
| 4,093,594 | 6/1978 | Anderson ........................... | 260/47 |
| 4,105,634 | 8/1978 | Hanson et al. ...................... | 526/65 |
| 4,113,684 | 9/1978 | Petrie ................................ | 260/29.2 |
| 4,116,900 | 9/1978 | Belanger et al. .................... | 260/18 |
| 4,134,864 | 1/1979 | Belanger ............................ | 260/18 |
| 4,137,140 | 1/1979 | Belanger ............................ | 204/18 |
| 4,139,510 | 2/1979 | Anderson ........................... | 260/18 |
| 4,182,831 | 1/1980 | Hicks ................................ | 528/103 |
| 4,246,148 | 1/1981 | Shimp et al. ....................... | 260/18 |
| 4,315,044 | 2/1982 | Elmore et al. ...................... | 427/386 |
| 4,420,574 | 12/1983 | Moriarity et al. .................... | 523/404 |
| 4,420,606 | 12/1983 | Waddill .............................. | 528/111 |
| 4,423,166 | 12/1983 | Moriarity et al. .................... | 523/414 |
| 4,423,170 | 12/1983 | Waddill .............................. | 523/417 |
| 4,430,261 | 2/1984 | Schäfer et al. ...................... | 260/404.8 |
| 4,533,254 | 8/1985 | Cook et al. ......................... | 366/176 |
| 4,608,300 | 8/1986 | Gruber .............................. | 428/285 |
| 4,608,405 | 8/1986 | DeGooyer .......................... | 523/404 |
| 4,608,406 | 8/1986 | Williams et al. .................... | 523/424 |
| 4,678,712 | 7/1987 | Elliott ............................... | 428/418 |
| 4,728,384 | 3/1988 | Goel ................................. | 156/307.3 |
| 4,738,995 | 4/1988 | Kooijmans et al. .................. | 523/404 |
| 4,810,535 | 3/1989 | McCollum et al. .................. | 427/410 |
| 4,824,927 | 4/1989 | Dobbelstein et al. ................ | 528/88 |
| 4,835,225 | 5/1989 | Massingll, Jr. et al. ............... | 525/481 |
| 4,883,830 | 11/1989 | Kitabatake et al. .................. | 523/414 |
| 4,886,867 | 12/1989 | Lin et al. ........................... | 528/111 |
| 4,937,275 | 6/1990 | Kooijams et al. .................... | 523/404 |
| 4,992,516 | 2/1991 | Schipfer et al. ..................... | 525/526 |
| 5,026,743 | 6/1991 | Beresford et al. ................... | 523/404 |
| 5,032,629 | 7/1991 | Hansen et al. ...................... | 523/414 |
| 5,034,434 | 7/1991 | Beresford et al. ................... | 523/404 |
| 5,057,557 | 10/1991 | Treybig et al. ...................... | 523/404 |
| 5,059,293 | 10/1991 | Sugishima et al. .................. | 204/181 |
| 5,221,700 | 6/1993 | Gilbert et al. ....................... | 523/404 |
| 5,246,984 | 9/1993 | Darwem et al. ..................... | 523/404 |

OTHER PUBLICATIONS

"Water–Reducible Coatings via Epoxy Resin Modification with Jeffamine (Reg. TM) Ed–2001 and Jeffamine (Reg TM) M–1000".

"Jeffamine® Polyoxypropyleneamine Curing Agents for Epoxy Resins", Texaco Chemical Company.

"Advanced Amine Technology for Superior Polymers", Texaco Chemical Company, 1992.

H. Lee and K. Neville, "Epoxy Polymers," *Encyclopedia of Polymer Science and Technology*, vol. 6, pp. 209–271, John Wiley and Sons, Inc., 1967.

*Encyclopedia of Polymer Science and Engineering*, John Wiley and Sons, New York, NY, vol. 6, pp. 340–361.

W. C. Griffith, "Emulsions", *Encyclopedia of Chemical Technology*, vol. 8, pp. 900–930, John Wiley & Sons, New York, NY, 1979.

"ANCAMINE® Curing Agent", Pacific Anchor Epoxy Curing Agents, Pacific Anchor Chemical Corporation, 1989.

*Primary Examiner*—Frederick Krass
*Attorney, Agent, or Firm*—Wayne C. Jaeschke; John Daniel Wood; Daniel S. Ortiz

[57] ABSTRACT

A method of curing an epoxy resin comprising mixing an epoxy resin with a curing agent is provided. The curing agent is selected from the group consisting of (i) a mixture consisting essentially of 1,2-diaminocyclohexane and an aliphatic polyamine (preferably at a molar ratio of 1,2-diaminocyclohexane to aliphatic polyamine of from about 1:1 to about 16:1, preferably about 2.5:1 to about 6:1 and more preferably about 3:1 to about 5:1) and (ii) the reaction product of reactants consisting essentially of an amine component consisting essentially of 1,2-diaminocyclohexane and an aliphatic polyamine and an epoxide component. The epoxide component has an epoxy functionality greater than one and is preferably a diglycidyl ether of an aromatic diol having an average degree of oligomerization of less than about 3.5., preferably less than about 1.5, and preferably derived from an alkyl bis-phenol, e.g. bisphenol A. The ratio of primary amine equivalents of said amine component to the total epoxide equivalents of said epoxide component are greater than one, i.e. the molar equivalents of primary amine groups of said amine component are in excess of the molar equivalents of epoxide groups, e.g. a ratio of from about 1.5:1 to 50:1, preferably from about 3:1 to about 20:1, more preferably from about 6:1 to about 15:1.

11 Claims, No Drawings

5,508,373

CURING AGENTS FOR EPOXY RESINS BASED ON 1,2-DIAMINOCYCLOHEXANE

FIELD OF THE INVENTION

The present invention relates to curing agents for epoxy resins and to their use.

BACKGROUND OF THE INVENTION

Aromatic amines such as methylenedianiline (i.e. p,p'-bis(aminophenyl)methane), metaphenylenediamine, etc,. have been used as epoxy curing agents for many years in applications which demand high mechanical strength, high glass transition temperatures, and high chemical resistance. Because of the toxicity associated with such amines, it would be desirable to find replacements for such amines that have lower toxicity, but which retain one or more of the performance characteristics of such amines.

The trade bulletin AMICURE PACM Curing Agent (Pacific Anchor Chemical Corporation, Los Angeles, Calif.) discloses that the compound bis-(p-aminocyclohexyl)methane has been promoted for use as a curing agent in the elevated temperature cure of liquid epoxy resins as an alternative to aromatic amines.

Isophorone diamine is a cycloaliphatic diamine which could be used to replace aromatic amines for applications where high temperature resistance of the cured coating is required.

SUMMARY OF THE INVENTION

This invention relates to method of curing an epoxy resin comprising mixing an epoxy resin with a curing agent selected from the group consisting of (i) a mixture consisting essentially of 1,2-diaminocyclohexane and an aliphatic polyamine and (ii) the reaction product of reactants consisting essentially of an amine component consisting essentially of 1,2-diaminocyclohexane and an aliphatic polyamine and an epoxide component having an epoxy functionality greater than one (preferably a diglycidyl ether of an aromatic diol having an average degree of oligomerization of less than about 3.5., preferably less than about 1.5, and preferably derived from an alkyl bis-phenol, e.g. bisphenol A), provided that the ratio of primary amine equivalents of said amine component to the total epoxide equivalents of said epoxide component are greater than one (i.e. the molar equivalents of primary amine groups of said amine component are in excess of the molar equivalents of epoxide groups, e.g. a ratio of from about 1.5:1 to about 50:1, preferably from about 3:1 to about 20:1, more preferably from about 6:1 to about 15:1).

The curing agent is mixed ,with an epoxy resin in a two component resin system. The amount of the curing agent should be sufficient to provide a reactive amine hydrogen content essentially equal to the epoxide equivalents provided by the epoxy resin.

DETAILED DESCRIPTION OF THE INVENTION

The curing agents of this invention are prepared from two major components. The first component is 1,2-diaminocyclohexane. The second component is an aliphatic polyamine, i.e. other than 1,2-diaminocyclohexane. The mixture of these two components can be used as a curing agent within the scope of this invention. In certain embodiments, the curing agent is an adduct of such a mixture with an epoxy component having an epoxy functionality greater than one. The nature of these components will be addressed in turn below.

The aliphatic polyamines useful in this invention are organic amines (other than 1,2-diaminocyclohexane) that have an amine functionality greater than one and that are free of aromatic, e.g. benzenoid, substituents that are covalently bonded to an amine nitrogen. Thus, a compound such as metaxylylene diamine would be considered an aliphatic polyamine because all amine nitrogen atoms are covalently bonded to benzylic carbon atoms rather than the benzenoid ring. Preferred aliphatic polyamines are alkylene polyamines. Examples of alkylene polyamines are the lower alkylene polyamines and lower polyalkylene polyamines. These preferred materials are commercially available or can be prepared by conventional preparative techniques. Preferred aliphatic polyamines contain at least 2 amine nitrogen atoms per molecule and at least 2 amine hydrogen atoms per molecule (and preferably at least 3 amine hydrogen atoms per molecule and no other groups which are reactive with epoxide). Useful polyamines typically contain about 2 to about 6 amine nitrogen atoms per molecule, 3 to about 8 amine hydrogen atoms, and 2 to about 12 carbon atoms. Mixtures of amines can also be used.

Examples of such amines are the alkylene polyamines such as ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine (i.e. 1,6-diaminohexane), 1,7-heptylene diamine, 1,10-decylene diamine, and the like. Also useful in this invention are polyamines of the formula $H_2N$—$R($—$NH$—$R)_n$—$NH_2$ wherein n is 1 to 4 and R is an alkylene group containing 2 to 8 carbon atoms, provided the total carbon atoms do not exceed 12. Examples of the preferred monoalkylene polyamines include 1,4-butylene diamine (tetramethylene diamine), 1,6-hexylene diamine (hexamethylene diamine), and 1,8-octylene diamine (octamethylene diamine). The polyalkylene polyamines have at least one secondary amine group. Examples of polyalkylene polyamines include diethylene triamine, triethylene tetramine, tetraethylene pentamine, pentaethylene hexamine, dipropylene triamine, tributylene tetramine, trimethylhexamethylene diamine, hexamethylene triamine and the like. The more preferred polyalkylene polyamines are the polyethylene polyamines with the most preferred being triethylenetetramine and diethylenetriamine.

Alicyclic diamines other than 1,2-diaminocyclohexane can also be used as an aliphatic polyamine. Examples of such alicyclic diamines include bis(p-aminocyclohexyl)methane, N-aminoethylpiperazine, isophorone diamine, and 1,3-cyclohexanedimethanamine.

The mixture is comprised of a major amount (i.e. at least 50 equivalent percent) on a molar basis of 1,2-diaminocyclohexane and a minor amount (i.e. less than 50 equivalent percent) on a molar basis of an aliphatic polyamine, preferably at a ratio of 1,2-diaminocyclohexane to aliphatic polyamine equivalents of from about 1:1 to about 16:1, preferably about 2.5:1 to about 6:1 and more preferably about 3:1 to about 5:1.

The curing agent can also be an adduct of the above-described mixture of amines and an epoxy component having an epoxide functionality greater than one. One of the advantages of such an adduct over the mixture of amines itself is that the viscosity of the mixture can be increased by the formation of the adduct. This increase in viscosity may, in turn, desirably increase the viscosity of a mixture of the adduct with an epoxy resin to be cured. The epoxy component useful in this invention, thus, has an epoxide functionality greater than one.

Examples of epoxy resins are glycidyl polyethers of dihydric alcohols (e.g. aliphatic glycols or aromatic glycols) and contain, on average, more than one, but not more than two 1,2-epoxide groups per molecule. Such polyepoxide materials are derived from an epihalohydrin and a dihydric phenol and have an epoxide equivalent weight of about 100 to about 4000, preferably from about 125 to about 525, and more preferably from about 150 to about 350. Examples of epihalohydrins are epichlorohydrin, epibromohydrin and epiiodohydrin, with epichlorohydrin being preferred. Aliphatic glycols include 1,4-butanediol and poly(oxypropylene) glycols. Aromatic dihydric alcohols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxyphenyl ethane, bis-(2-hydroxy-naphthyl)-methane, 1,5-dihydroxynaphthalene and the like with Bisphenol A being preferred.

These polyepoxide materials are well known in the art and are made in desired molecular weights by reacting the epihalohydrin and the dihydric alcohol in various ratios or by reacting a dihydric alcohol with a lower molecular weight polyepoxide material. Preferred polyepoxide materials are glycidyl polyethers of Bisphenol A having epoxide equivalent weights of about 150 to about 525 and, thus, have from just greater than 1.0 (e.g. from about 1.1) to just less than 3.5 (e.g. up to about 3.4) dihydric phenol groups per polyether molecule, and more preferably have epoxide equivalent weights of less than 400.

The epoxy component may also contain mono-epoxy compounds, e.g. an aromatic mono-glycidyl ether (i.e., a compound having at least one aromatic ring having attached thereto an glycidyl functional group and no other reactive functional groups). Representative examples of aromatic mono-glycidyl ethers include the monoglycidyl ethers of monohydric aromatic alcohols such as phenol and naphthanol, mono- or dialkyl-substituted monoglycidyl ethers of monohydric aromatic alcohols, said alkyl groups having from about 1 to about 4 carbon atoms, such as the monoglycidyl ether of o-cresol, m-cresol, p-cresol, o-ethyl-phenol, m-ethyl-phenol, p-ethyl-phenol, o-(n-propyl)-phenol, m-(n-propyl)-phenol, p-(n-propyl)-phenol, o-isopropyl-phenol, m-isopropyl-phenol, p-isopropyl-phenol, o-(n-butyl)-phenol, m-(n-butyl)-phenol, p-(n-butyl)-phenol, m-(t-butyl)-phenol, p-(t-butyl)-phenol, 2,4-dimethyl-phenol, 3,5-dimethyl-phenol, 3-methyl-5-ethyl-phenol, 2-methyl-4-(n-propyl)-phenol, or 2-methyl-4-(t-butyl)-phenol.

The ratios of the reactants are selected so that the primary amine equivalents of the amine component are greater than total epoxide equivalents of said aromatic glycidyl ether and said diglycidyl ether of an aromatic diol. This means that, on average, less than all of the primary amine groups will be converted to secondary amines (i.e. a group still having a reactive secondary amine hydrogen, albeit less reactive than a primary amine hydrogen). The ratio of total primary amine equivalents of the amine component to the total epoxide equivalents of said epoxy component will preferably be from about 1.5:1 to 50:1, preferably from about 3:1 to about 20:1, more preferably from about 6:1 to about 15:1.

While not wishing to exclude any other components unnecessarily, it is noted that the use of volatile acids to salt the curing agent are not needed in the curing agent and so should be excluded. Further, it is believed that the selection of components is so important to the performance of the curing agent that other components which would affect the essential attributes of the curing agent, or cured epoxy resins prepared therefrom, should be excluded. The skilled artisan will, with the aid of the following description, be able to determine whether a particular component in a particular amount will affect the attributes of the curing agent in an essential manner.

The reaction medium is typically maintained at moderate temperatures during the reaction. Such temperatures avoid degradative side reactions which can affect the appearance (e.g. by excessive color formation) of the reaction product. Typical temperatures that will be maintained during the reaction range from about 50° C. to about 150° C., preferably from about 60° C. to about 100° C., for a time sufficient to bring the reaction to completion, typically about 5 minutes to 4 hours. Lower temperatures may be employed at the expense of increasing the reaction time. The reaction medium is also typically treated to exclude oxygen to a practicable degree, e.g. by blanketing and/or sparging the reaction zone with an inert gas, e.g, dry nitrogen.

The curing agent is used for curing an epoxy resin having more than one terminal epoxide group. Epoxy resins are described by L. V. McAdams, "Epoxy Resins", *Encyclopedia of Polymer Science and Engineering*, vol. 6, pp. 322–382 (John Wiley & Sons, Inc. N.Y, N.Y., 1986) the disclosure of which is incorporated herein by reference. Examples of epoxy resins include liquid or solid resins based on epichlorohydrin and bisphenol-A, phenoxy resins, epoxy resin esters, epoxy phenol novolac resins, epoxy cresol novolac resins, glycidyl ester resins, cycloaliphatic resins, and epoxidized oils. In preferred embodiments, the epoxy resin is essentially free of compounds in which an aromatic, e.g. benzenoid, substituent is covalently bonded to an amine nitrogen. Thus, in the preferred compositions of this invention, aromatic glycidyl amine resins should not be employed. The epoxy resins preferred for use in the curable compositions include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A.

The amount of epoxy resin which is present in the curing composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive amine hydrogen equivalent weight ratio of from about 0.5:1.0 to about 1.5:1.0, and, preferably, from about 0.8:1.0 to about 1.2:1.0.

The epoxy resin and curing agent composition can be used in any of a variety of applications as disclosed in "Epoxy Resins" at pages 370–380. Such applications include the use of the composition in laminating, filament winding, pultrusion, casting, or molding. For example, in filament winding, the composition is used as a binder for the production of filament-wound, glass-reinforced structures, e.g. chemical-resistant pipe.

The following examples will serve to further illustrate the invention, but should not be construed to limit the invention, unless expressly set forth in the appended claims. All parts, percentages, and ratios are by weight unless otherwise indicated in context.

EXAMPLES

Example 1

A curing agent was prepared by charging to a reactor 90 parts by weight of a mixture of 80% by weight 1,2-diaminocyclohexane (DACH), 19% by weight of hexamethylenediamine (HMDA) (thus approximately 1.4 total primary amine equivalents), and 1% by weight of water. To this mixture was slowly added 10 parts by weight of a bisphenol F resin (commercially available as EpAlloy 8230) with mixing and under dry nitrogen gas. The bisphenol F resin was added at a rate sufficiently slow to keep the exotherm of the reaction from raising the temperature in the reactor above 120° C. The mixture was then held for one hour at 120° C. The resulting product had a viscosity of about 20 cps (Thermosel at 25° C.) and was stable as a liquid at least overnight. The mixture exhibited a gel time with DER 331 of 33.7 minutes. When 32.4 parts by weight of the resulting mixture was reacted with 167.6 parts by weight of the diglycidyl ether of bisphenol A (DER 331 from Dow Chemical) and cured at 150° C., the resulting cured product exhibited a Tg by differential scanning calorimetry of greater than 150° C.

Comparative Example A

The procedure of Example 1 was repeated, with the exception that the mixture of 80% by weight 1,2-diaminocyclohexane (DACH), 19% by weight of hexamethylenediamine (HMDA) (thus approximately 1.4 total primary amine equivalents), and 1% by weight of water was replaced with 99% pure 1,2-diaminocyclohexane. The resulting mixture exhibited severe crystallization overnight. When 28.6 parts by weight of the resulting mixture was reacted with 168.7 parts by weight of the diglycidyl ether of bisphenol A (DER 331 from Dow Chemical) and cured at 150° C., the mixture exhibited a gel time of 59.8 minutes. The resulting cured product exhibited a Tg by differential scanning calorimetry of greater than 150° C.

Example 2

The procedure of Example 1 was repeated with the exception that the diglycidyl ether of bisphenol A (DER 331 from Dow Chemical) was substituted for the bisphenol F resin. The resulting product was a stable liquid at least overnight.

Example 3

A curing agent was prepared by charging to a reactor 82.5 parts by weight of a mixture of 80% by weight 1,2-diaminocyclohexane (DACH), 19% by weight of hexamethylenediamine (HMDA), and 1% by weight of water and 10 parts by weight of toluene. To this mixture was slowly added 17.5 parts by weight of the diglycidyl ether of bisphenol A (DER 331 from Dow Chemical) with mixing and under dry nitrogen gas. The DER 331 was added at a rate sufficiently slow to keep the exotherm of the reaction from raising the temperature in the reactor above 75° C. The mixture was then held for two hours at 75° C. The mixture was then heated to 115° C. and water distilled from the mixture and was collected. The temperature was then increased to 145° C. to drive off substantially all the water and the pressure was lowered to remove substantially all remaining water and toluene. The resulting product had a viscosity of about 56.5 cps (Thermosel at 25° C.) and exhibited a gel time with DER 331 of 52.6 minutes. When a mixture of 22 parts of the product per hundred parts of DER 331 was cured at 150° C. for 15 minutes, the resulting cured product exhibited a Tg by differential scanning calorimetry of greater than 155° C. When a mixture of 20 parts of the product per hundred parts of DER 331 was cured at 150° C. for 15 minutes, the resulting cured product exhibited a Tg by differential scanning calorimetry of greater than 150° C.

Example 4

A curing agent was prepared by charging to a reactor 80 parts by weight of a mixture of 80% by weight 1,2-diaminocyclohexane (DACH), 19% by weight of hexamethylenediamine (HMDA), and 1% by weight of water and 8 parts by weight of heptane. To this mixture was slowly added 20 parts by weight of the diglycidyl ether of bisphenol A (DER 331 from Dow Chemical) with mixing and under dry nitrogen gas. The DER 331 was added at a rate sufficiently slow to keep the exotherm of the reaction from raising the temperature in the reactor above 75° C. The mixture was then held for two hours at 75° C. The mixture was then heated to 105° C. and water distilled from the mixture was collected. The pressure was lowered to remove substantially all remaining water and heptane. The resulting product had a viscosity of about 71 cps (Thermosel at 25° C.) and exhibited a gel time with DER 331 of 48 minutes.

Example 5

One hundred parts by weight of the diglycidyl ether of bisphenol A (DER 331 from Dow Chemical) was cured with 10 parts by weight of a mixture of 80% by weight 1,2-diaminocyclohexane (DACH), 19% by weight of hexamethylenediamine (HMDA), and 1% by weight of water. The resulting cured product exhibited a Tg by differential scanning calorimetry of 67.99° C.

Example 6

One hundred parts by weight of the diglycidyl ether of bisphenol A (DER 331 from Dow Chemical) was cured with 13 parts by weight of a mixture of 80% by weight 1,2-diaminocyclohexane (DACH), 19% by weight of hexamethylenediamine (HMDA), and 1% by weight of water. The resulting cured product exhibited a Tg by differential scanning calorimetry of 108.96° C.

Example 7

One hundred parts by weight of the diglycidyl ether of bisphenol A (DER 331 from Dow Chemical) was cured with 15 parts by weight of a mixture of 80% by weight 1,2-diaminocyclohexane (DACH), 19% by weight of hexamethylenediamine (HMDA), and 1% by weight of water. The resulting cured product exhibited a Tg by differential scanning calorimetry of 139.01° C.

Example 8

One hundred parts by weight of the diglycidyl ether of bisphenol A (DER 331 from Dow Chemical) was cured with 17 parts by weight of a mixture of 80% by weight 1,2-diaminocyclohexane (DACH), 19% by weight of hexamethylenediamine (HMDA), and 1% by weight of water. The resulting cured product exhibited a Tg by differential scanning calorimetry of 156.48° C. The gel time of a 200 gram mass of the curable composition was 37.8 minutes.

Example 9

One hundred parts by weight of the diglycidyl ether of bisphenol A (DER 331 from Dow Chemical) was cured with 18 parts by weight of a mixture of 80% by weight 1,2-diaminocyclohexane (DACH), 19% by weight of hexamethylenediamine (HMDA), and 1% by weight of water. The resulting cured product exhibited a Tg by differential scanning calorimetry of 152.77° C.

Example 10

One hundred parts by weight of the diglycidyl ether of bisphenol A (DER 331 from Dow Chemical) was cured with 20 parts by weight of a mixture of 80% by weight 1,2-diaminocyclohexane (DACH), 19% by weight of hexamethylenediamine (HMDA), and 1% by weight of water. The resulting cured product exhibited a Tg by differential scanning calorimetry of 137.72° C.

What is claimed is:

1. A method of forming a curable epoxy resin composition comprising: mixing an epoxy resin with a curing agent which is the reaction product of an amine component consisting essentially of 1,2-diaminocyclohexane and an aliphatic polyamine in a molar ratio of from 3:1 to 5:1 and an epoxide component having an epoxy functionality greater than one, provided that the ratio of primary amine equivalents of said amine component to the total of epoxide equivalents of said epoxide component is from 1.5:1 to 50:1, wherein the aliphatic polyamine is selected from the group consisting of 1,4-butylenediamine, 1,5-pentylenediamine, 1,6-hexylenediamine, and 1,7-heptylenediamine.

2. A method of claim 1 wherein said aliphatic polyamine is hexamethylene diamine.

3. A method of claim 1 wherein said curing agent is the reaction product of an amine component consisting essentially of 1,2-diaminocyclohexane and said aliphatic polyamine and an epoxide component having an epoxy functionality greater than one which is a diglycidyl ether of an aromatic diol.

4. A method of claim 3 wherein said epoxide component consists of a diglycidyl ether of an aromatic diol having an average degree of oligomerization of less than about 1.5.

5. A method of claim 3 wherein the ratio of molar equivalents of primary amine groups of said amine component to molar equivalents of epoxide groups in the curing agent is from about 3:1 to about 20:1.

6. A method of claim 3 wherein the ratio of molar equivalents of primary amine groups of said amine component to molar equivalents of epoxide groups in the curing agent is from about 6:1 to about 15:1.

7. A method of claim 3 wherein the molar ratio of 1,2-diaminocyclohexane to aliphatic polyamine is from about 3:1 to about 5:1 and the ratio of molar equivalents of primary amine groups of said amine component to molar equivalents of epoxide groups in the curing agent is from about 6:1 to about 15:1.

8. An epoxy curing agent comprising the reaction products of:
an amine component consisting essentially of 1.2-diaminocyclohexane and an aliphatic polyamine in a molar ratio of from 3:1 to 5;1, and
an epoxide component having an epoxy functionality greater than 1, provided that the ratio of primary amine equivalents of said amine component to the total of epoxide equivalents of said epoxide component is from 1.5:1 to 50:1, wherein the aliphatic polyamine is selected from the group consisting of 1,4-butylenediamine, 1,5-pentylenediamine, 1.6-hexylenediamine, and 1,7-heptylenediamine.

9. A curable composition comprising an epoxy resin and the curing agent of claim 8.

10. A composition of claim 9 wherein the ratio of epoxide equivalents of said epoxy resin to reactive amine hydrogen equivalents of said curing agent is from about 0.5:1.0 to about 1.5:1.0.

11. A composition of claim 9 wherein the ratio of epoxide equivalents of said epoxy resin to reactive amine hydrogen equivalents of said curing agent is from about 0.8:1.0 to about 1.2:1.0.

\* \* \* \* \*